United States Patent [19]

Schäfer

[11] 4,144,775

[45] Mar. 20, 1979

[54] TRANSMISSION FOR A TWO-WORM PRESS WITH COUNTER RUNNING WORMS

[75] Inventor: Heinrich Schäfer, Vellmar, Fed. Rep. of Germany

[73] Assignee: Thyssen Industrie Aktiengesellschaft, Essen, Fed. Rep. of Germany

[21] Appl. No.: 836,474

[22] Filed: Sep. 26, 1977

[30] Foreign Application Priority Data

Oct. 18, 1976 [DE] Fed. Rep. of Germany ... 7632517[U]

[51] Int. Cl.[2] ........................ F16H 37/06; F16H 1/12; F16H 1/18

[52] U.S. Cl. ............................ 74/665 GA; 74/421 R; 74/424.5

[58] Field of Search ............ 74/412 R, 421 R, 665 G, 74/665 GA, 665 GD, 424.5

[56] References Cited

U.S. PATENT DOCUMENTS

| | | | |
|---|---|---|---|
| 3,359,826 | 12/1967 | Hanslick | 74/421 R X |
| 3,969,956 | 7/1976 | Hanslick | 74/665 GD |

*Primary Examiner*—Leonard H. Gerin
*Attorney, Agent, or Firm*—Walter Becker

[57] ABSTRACT

A transmission for a two-worm press with two counter-running worms, which includes two transmission output shafts respectively connectable to the two counter-running worms, first gears laterally offset relative to each other. These first gears are drivingly interconnected by second gears forming intermediate gears. The transmission also includes a bearing housing detachably connected to a transmission housing which houses axial bearings for the transmission output shafts and also houses the bearings for the intermediate gears. The bearing housing is connected to the worm housing of the two-worm press by means of the rods extending through the transmission housing. One of the transmission output shafts is firmly connected to a first extension shaft so that the latter is rotatable with said one transmission shaft. This extension shaft extends through the bearing housing and has its output end axially supported by and connected to an output shaft of a stepdown transmission the housing of which is detachably connected to the bearing housing. The second transmission output shaft is connected to a second extension shaft which is journalled in the bearing housing by means of an axial bearing forming a tandem bearing.

3 Claims, 3 Drawing Figures

TRANSMISSION FOR A TWO-WORM PRESS WITH COUNTER RUNNING WORMS

The present invention relates to a transmission for a two-worm press with counter-running worms the transmission output shafts of which are provided with teeth laterally offset relative to each other and which through intermediate gears mesh each other. The transmission according to the present invention is provided with a bearing housing screwed to the outside of the transmission housing for receiving the axial bearings which serve for supporting the transmission output shafts, said bearing housing being connected to the worm housing by means of tie rods extending through the transmission housing.

Transmissions for two-worm presses with counter-running worms have become known in which the gears necessary for reducing the speed and located between the driving motor and the worms are arranged in a single transmission housing. The axial forces of the two worms are through axially displaceable transmission output shafts transmitted to the axial bearings which are arranged on that side of the transmission housing which faces away from the worm housing. By means of tie rods which on one hand are connected to the housing of the axial bearing and on the other hand are connected to the worm housing and in a contact-free manner are passed through the transmission housing, the worm back pressure forces are returned from the axial bearing to the worm housing.

These transmissions have the drawback that with regard to dimensions and arrangement of the gears, especially in the transmission end stage on the side of the worms, said transmissions are designed only for a definite distance between the worms and for a definite admissible torque load so that these transmissions represent single purpose transmissions inasmuch as they are not usable for different distances between the worms and cannot be used for higher torques deviating from the once selected design.

It is an object of the present invention so to design a transmission of the above mentioned general type that with slight structural changes it can be adapted to different requirements with regard to the distance between the worms and with regard to the torques.

These and other objects and advantages of the invention will appear more clearly from the following specification in connection with the accompanying drawings in which.

The transmission according to the invention is for a two-worm press with counter-running worms and is characterized primarily in that the two transmission output shafts together with intermediate gears are individually journalled in a transmission housing, and that one of said transmission output shafts is nonrotatably connected to an extension shaft extending through the bearing housing, and, supported in axial direction, is connected to the output end of an output shaft of a step-down transmission screwed onto a bearing housing, said output shaft being provided with a preceding additional axial bearing. The second transmission output shaft is connected to an extension shaft which by means of an axial bearing designed as a tandem bearing is arranged in the bearing housing.

Figure 1:
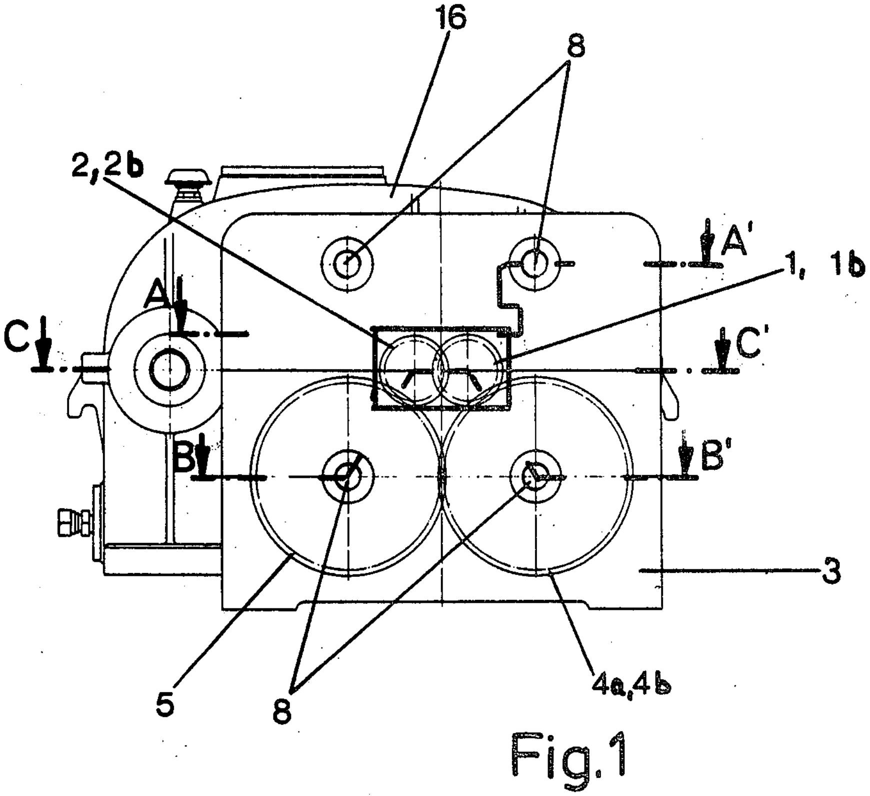
FIG. 1 is a side view of a transmission according to the invention for a two-worm press which transmission has a connecting surface directed toward the worm housing.
Figure 2:
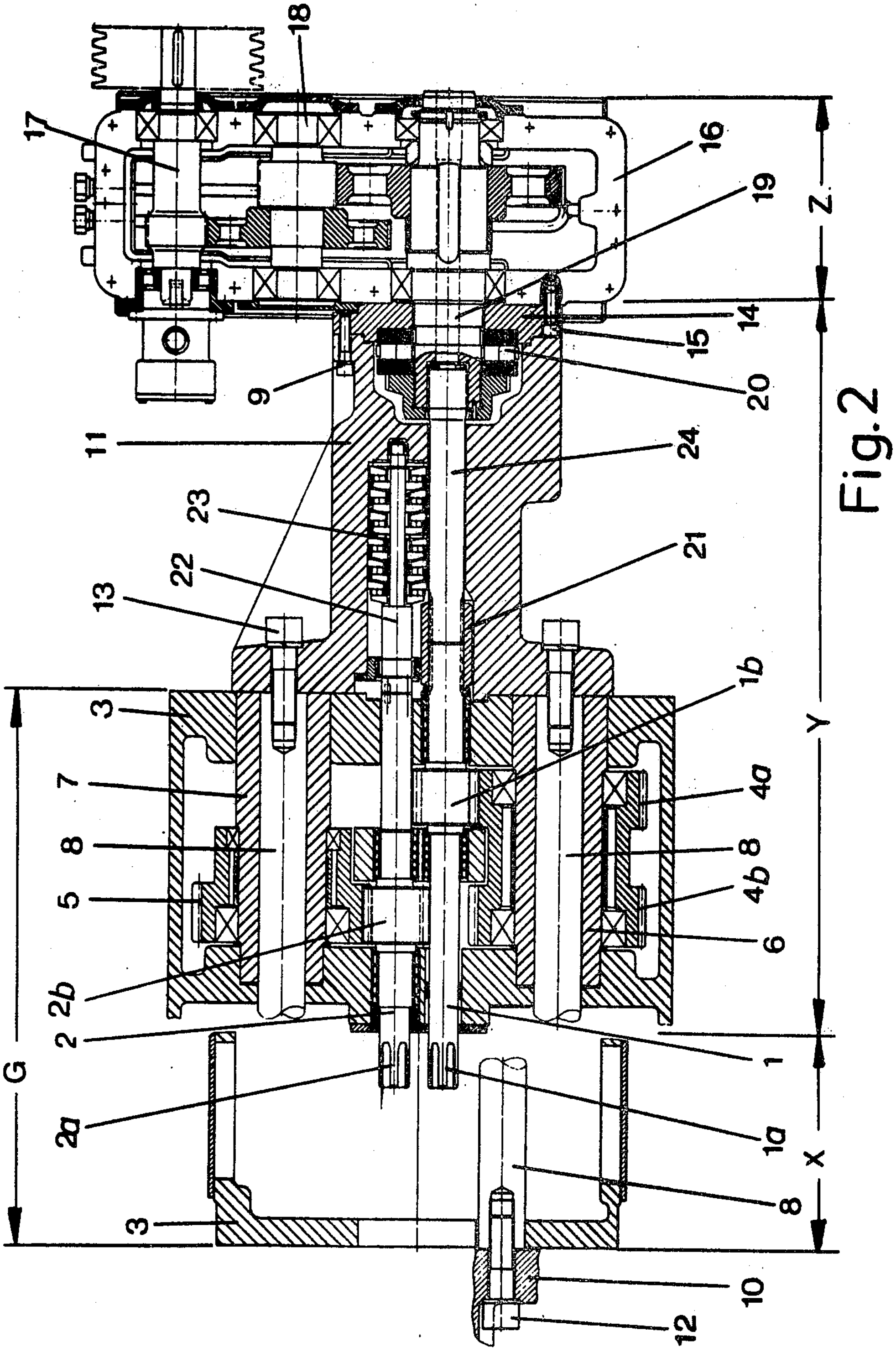
FIG. 2 shows three combined sections respectively taken along the lines A–A′, B–B′ and C–C′ in FIG. 1.
Figure 3:
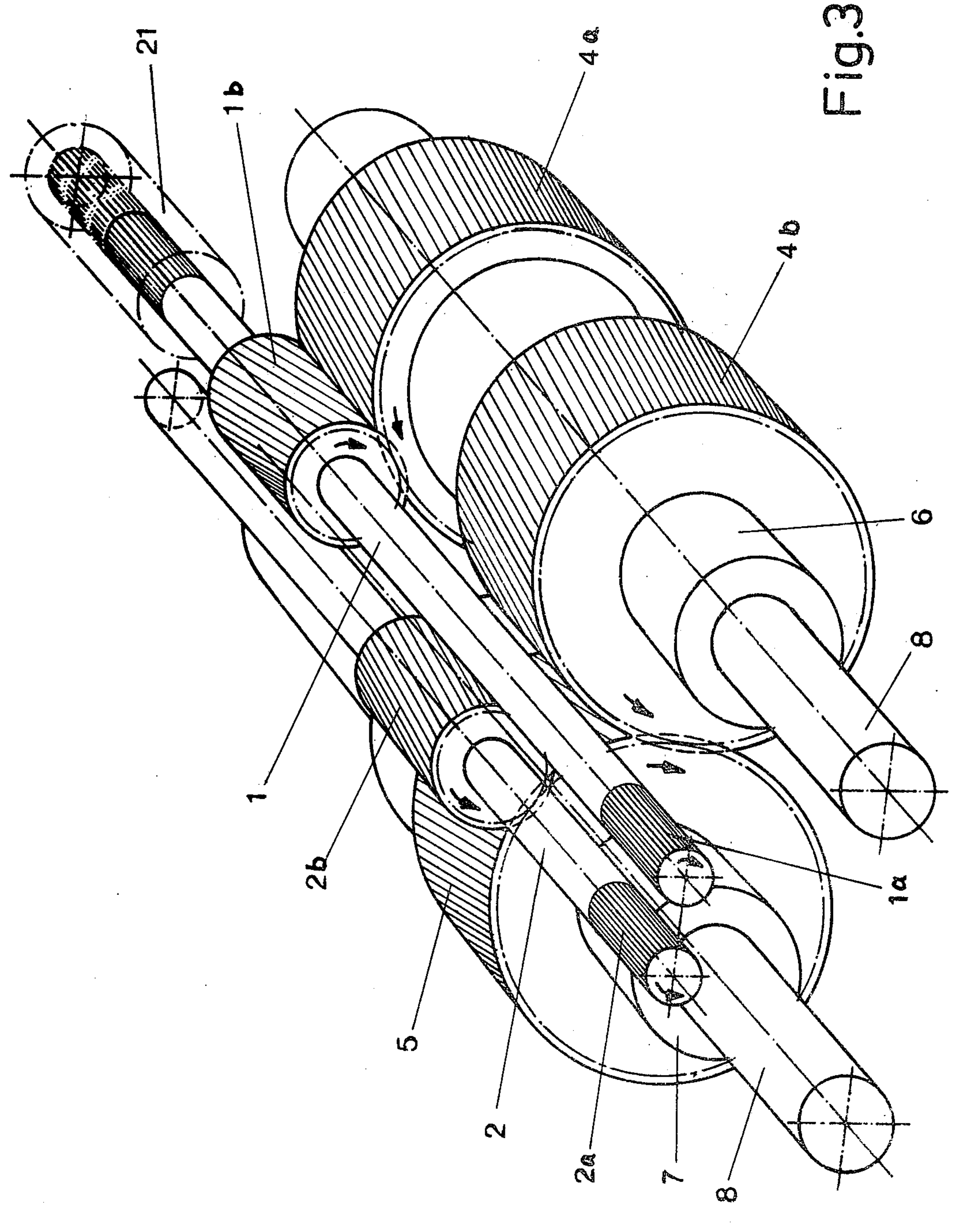
FIG. 3 illustrates in perspective the interrelationship of shafts and gearing for power transfer by the transmission of FIGS. 1 and 2.

Referring now to the drawings in detail, the section A–A′ comprises the front region of the transmission housing 3 which extends over the distance x in FIG. 2. The section B–B′ covers the region of the transmission housing 1 and the bearing housing 11, which region is designated with the letter Y. The section C–C′ covers the region of the built-on step-down transmission with the housing 16 which last mentioned region is designated with the letter Z. With the transmission illustrated in FIGS. 1 and 2 for a two-worm press, the two transmission output shafts 1 and 2 are by non-illustrated radial bearings journalled in a transmission housing 3. The transmission output shafts 1 and 2 are at their splined ends **1*a* and 2*a* by non-illustrated coupling sleeves nonrotatably connected to the non-illustrated drive ends of the worms. The transmission output shafts 1 and 2 are furthermore provide with spur gears 1*b*, 2*b* which are laterally offset with regard to each other. Gear 1*b*, driven by shaft 1, meshes with gear 4*a* to drive gear 4*b* which is fixed thereto. Gear 4*b* meshes with gear 5 which engages gear 2*b* fixed on shaft 2, so that the two output shafts 1 and 2 will drive a two-worm press. The intermediate gears 4*a* and gear 4*b* are nonrotatably connected to each other. The intermediate gears 4*a*, 4*b* and 5 are rotatably journalled on hollow intermediate shafts 6 and 7, respectively, which are fixedly journalled in the transmission housing 3. Two of the total of four tie rods 8 are passed through the hollow intermediate shafts 6 and 7. These two tie rods 8 have their end faces rest on one hand against the flanged surface of the worm housing 10 of which only an cutout is shown and, on the other hand against the flanged surface of the bearing housing 11. The said two tie rods 8 are respectively connected to the respective surfaces engaged thereby, by screws 12 and 13 extending through said flanged surfaces. The length of the four tie rods 8 is with this arrangement slightly greater than the distances between the two end faces of the transmission housing 3 which last mentioned distance is designated in FIG. 2 with the character G. The bearing housing 11 is on one hand connected by non-illustrated screws to the transmission housing 3 and has its oppositely located end face by means of screws 9 connected to an intermediate plate 14 which in its turn is by means of screws 15 connected to the transmission housing 16 of a step-down transmission. This step-down transmission with its drive shaft 17, the intermediate shaft 18, and the transmission output shaft 19 with the additional axial bearing 20 arranged on the outside of the intermediate plate 14** on the transmission housing, corresponds in its construction to a transmission for driving one worm presses.

The non-rotatable connection between the transmission output shaft 19 of the step-down transmission and the transmission output shaft consists of an extension shaft 24 passed through the bearing housing 11. This extension shaft 24 is on one hand through a splined coupling sleeve 21 connected to the correspondingly designed end of the transmission output shaft 1 and on the other hand corresponds to a splined shaft end in the correspondingly designed hub and of the transmission output shaft 19. Thus, the worm back pressure force acting upon the transmission output shaft 1 in axial direction is transmitted to the preceding axial bearing 10 of the step-down transmission and from there is through the intermediate plate 14, the bearing housing 11, and the tie rods 8 returned to the worm housing.

The worm back pressure force acting upon the transmission output shaft 2 is by means of an extension shaft 22 conveyed to the axial bearing 23 which is arranged in the bearing housing 11 and designed as tandem bearing, and is likewise through the intervention of the tie rods 8 returned to the worm housing.

For adapting the transmission according to the invention to different distances between the worms, it is merely necessary to exchange the transmission part with the transmission output shafts 1 and 2 and the intermediate shafts. The adaptation to greater axial forces can be effected by exchanging the axial bearing 23. The step-down transmission can in the above mentioned cases be retained without any changes.

As will be evident from the above, the advantage according to the present invention consists primarily in that merely the transmission part with the transmission output shafts 1, 2 and the bearing housing 11 of the respective distance between the worms has to be produced while as step-down transmissions, mass produced transmissions of one worm presses can be employed.

It is, of course, to be understood that the present invention is, by no means, limited to the specific showing in the drawings, but also comprises any modifications within the scope of the appended claims.

What I claim is:

1. A transmission for a two-worm press with two counter-running worms, which includes: a first transmission housing, two transmission output shafts journalled in said transmission housing for respective connection with two worms in a two worm press, one of said transmission output shafts being a driving shaft and the other one of said transmission output shafts being a driven shaft, gears including first gears laterally offset relative to each other, and respectively drivingly associated with said transmission output shafts, said gears also including second gears representing intermediate gears and drivingly interconnecting said first gears, said two transmission output shafts with said first and second gears being journalled in said transmission housing, a bearing housing detachably connected to said transmission housing, a first extension shaft arranged in said bearing housing in axial alignment with said driving transmission output shaft connected thereto so as to rotate therewith, a second extension shaft likewise arranged in said bearing housing in axial alignment with said driven transmission output shaft and connected thereto so as to rotate therewith, a second transmission housing detachably connected to said bearing housing, an output shaft arranged in said second transmission housing in axial alignment with said first extension shaft and being connected to said first extension shaft to cause the latter to rotate therewith, a first axial bearing associated with that end of said last mentioned output shaft which faces said first extension shaft for absorbing axial forces exerted upon said driving transmission output shaft in the direction toward said second transmission housing, and a second axial bearing arranged in said bearing housing and associated with said second extension shaft for absorbing axial forces exerted upon said driven transmission output shaft in the direction toward said second transmission housing.

2. A transmission according to claim 1, in which said second axial bearing is a tandem bearing.

3. A transmission according to claim 1, which includes tie rod means extending through said first transmission housing for connecting said bearing housing to a two-worm press in connection with which said transmission is to be employed.

* * * * *